(12) United States Patent
Barringer

(10) Patent No.: US 7,002,349 B2
(45) Date of Patent: *Feb. 21, 2006

(54) REMOTE SENSING ELECTRIC FIELD EXPLORATION SYSTEM

(75) Inventor: Anthony R. Barringer, Golden, CO (US)

(73) Assignee: Telluric Exploration, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/949,484

(22) Filed: Sep. 24, 2004

(65) Prior Publication Data

US 2005/0285598 A1 Dec. 29, 2005

Related U.S. Application Data

(60) Provisional application No. 60/582,185, filed on Jun. 24, 2004.

(51) Int. Cl.
*G01V 3/16* (2006.01)
(52) U.S. Cl. ....................... 324/330; 324/350; 343/705
(58) Field of Classification Search ................ 324/323, 324/330, 331, 348, 349, 350; 343/705–708, 343/719; 244/1 TD
See application file for complete search history.

(56) References Cited

U.S. PATENT DOCUMENTS

| | | | | | |
|---|---|---|---|---|---|
| 4,309,659 | A | * | 1/1982 | Yoshii ......................... | 324/345 |
| 4,628,266 | A | * | 12/1986 | Dzwinel ...................... | 324/330 |
| 4,686,475 | A | * | 8/1987 | Kober et al. ................. | 324/349 |
| 6,191,587 | B1 | * | 2/2001 | Fox ............................. | 324/350 |
| 6,244,534 | B1 | * | 6/2001 | Klinkert ................... | 244/1 TD |
| 6,255,825 | B1 | * | 7/2001 | Seigel et al. ................. | 324/331 |
| 6,532,817 | B1 | * | 3/2003 | Yukawa et al. ........... | 73/504.16 |
| 6,765,383 | B1 | * | 7/2004 | Barringer .................... | 324/330 |
| 6,842,006 | B1 | * | 1/2005 | Conti et al. ................. | 324/350 |
| 6,845,936 | B1 | * | 1/2005 | Mouge et al. ............ | 244/1 TD |
| 2003/0094952 | A1 | * | 5/2003 | Morrison et al. ........... | 324/330 |
| 2004/0108854 | A1 | * | 6/2004 | Nichols ....................... | 324/348 |
| 2005/0073302 | A1 | * | 4/2005 | Hibbs et al. ................. | 324/247 |

* cited by examiner

*Primary Examiner*—Bot Ledynh
*Assistant Examiner*—Kenneth J. Whittington
(74) *Attorney, Agent, or Firm*—Edwin H. Crabtree; Ramon L. Pizarro

(57) ABSTRACT

An airborne exploration system used with an aircraft for shallow and deep exploration for oil and gas, mineral deposits and aquifers. The survey system uses natural electromagnetic EM fields as an energy source. The exploration system includes a pair of aerodynamic housing pods adapted for mounting on wing tips of the aircraft. The housing pods include electric field sensors with three orthogonal electric dipoles oriented along an X, Y and Z axis. An optional third set of orthogonal electric dipoles can be mounted in the tail of the aircraft. The field sensors are electrically attached to angular motion detectors mounted inside housing pods. The motion detectors are used for compensating for errors caused by angular motion of the aircraft when in the presence of strong electric field gradients. The system also includes a total field magnetometer mounted in the aircraft. The various filtered outputs of the magnetometer are used to provide phase and amplitude references for the similarly filtered and angular motion corrected outputs of the electric field sensors. The electric field data when normalized and phase referenced against the magnetic field data provides valuable geological and geophysical information related to the subsurface flow of telluric currents.

15 Claims, 8 Drawing Sheets

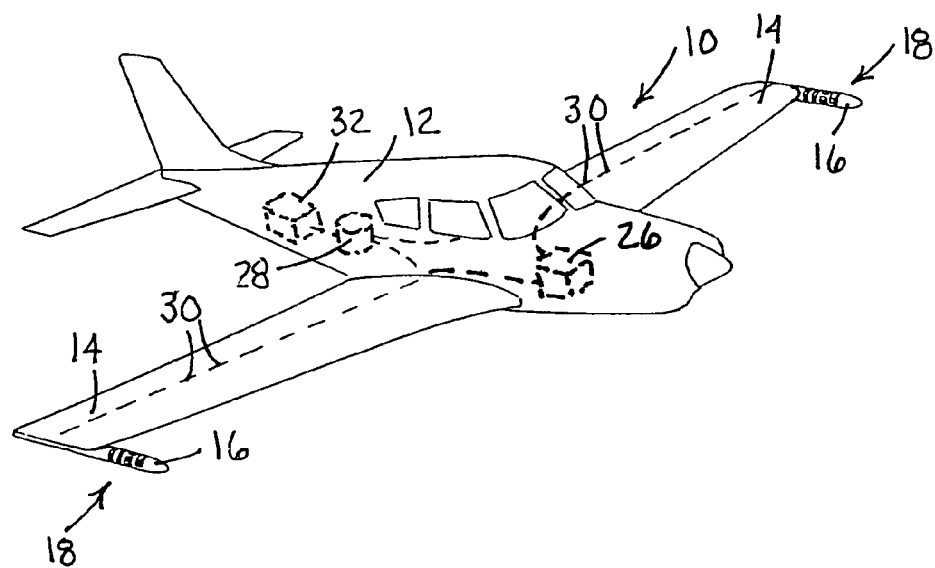
FIG. 1
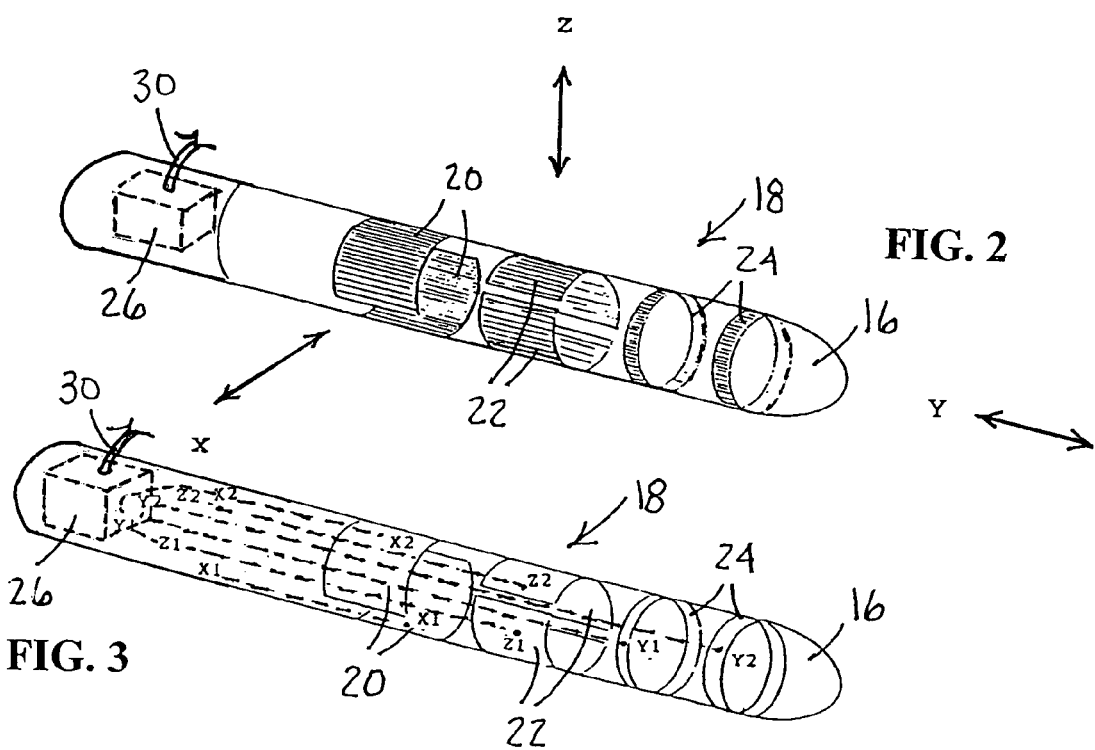
FIG. 2
FIG. 3

FIG. 6. FLYING HEIGHT 2,500 FT. ACROSS

FIG. 7    FLIGHT LINE ACROSS MAJOR DEEP GAS FIELD

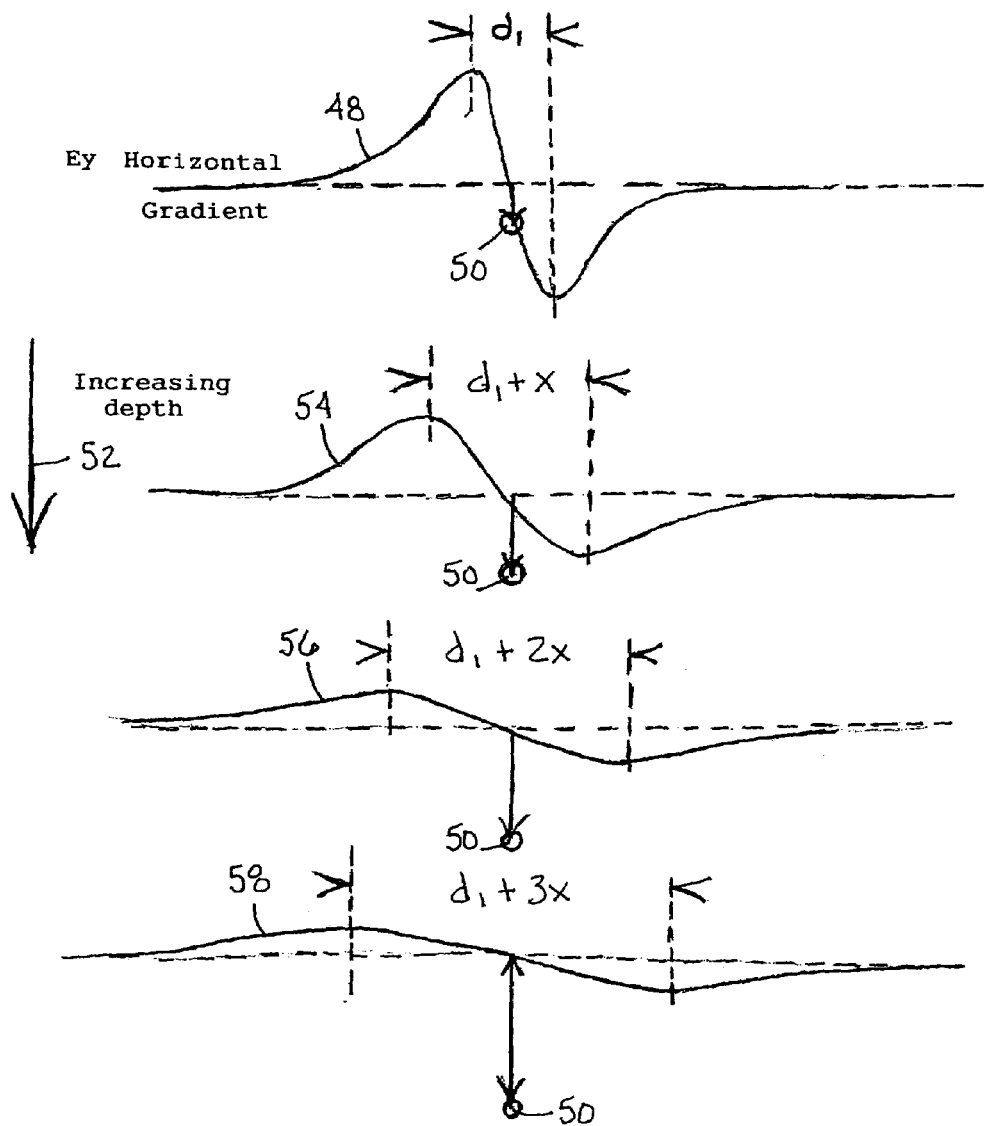
FIG. 9 DERIVATIVES OF THE HORIZONTAL ELECTRIC FIELD CROSSING TARGETS AT INCREASING DEPTHS

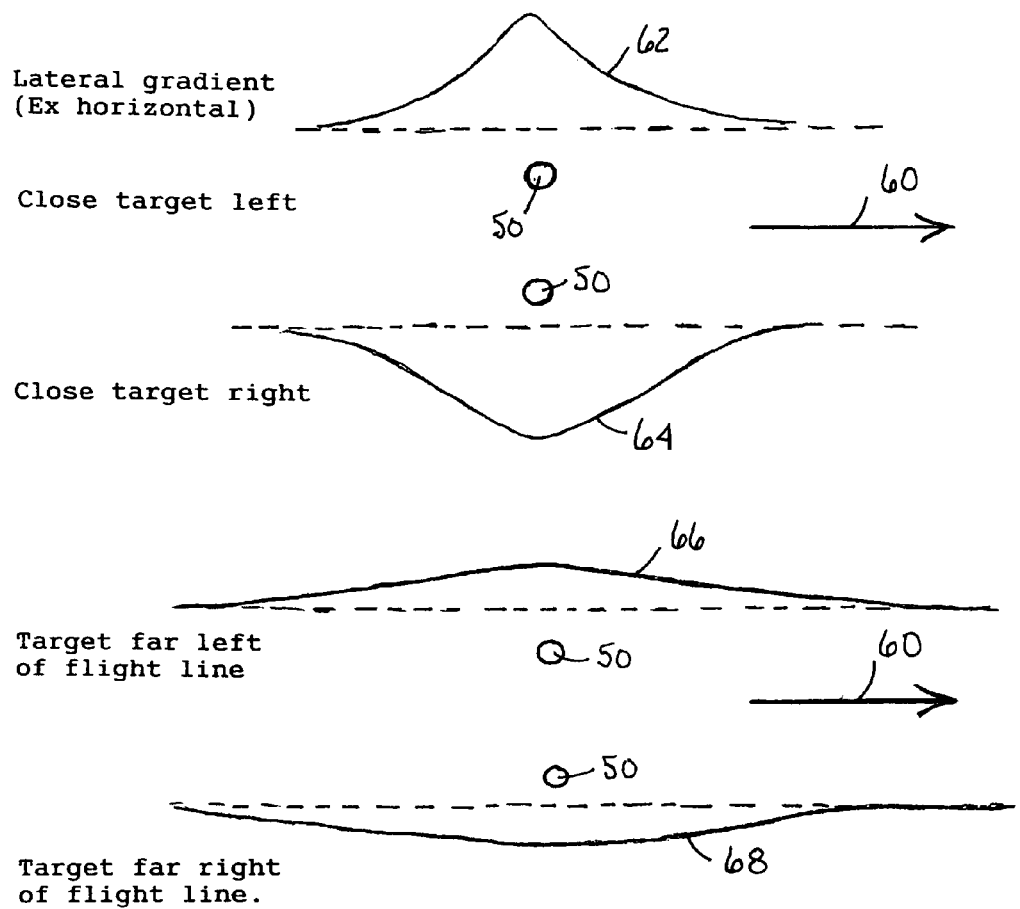
FIG. 10 DERIVATIVES OF THE HORIZONTAL GRADIENT ELECTRIC FIELDS PERPENDICULAR TO THE FLIGHT LINES SHOWING OFF-LINE DETECTION TO THE LEFT OR RIGHT.

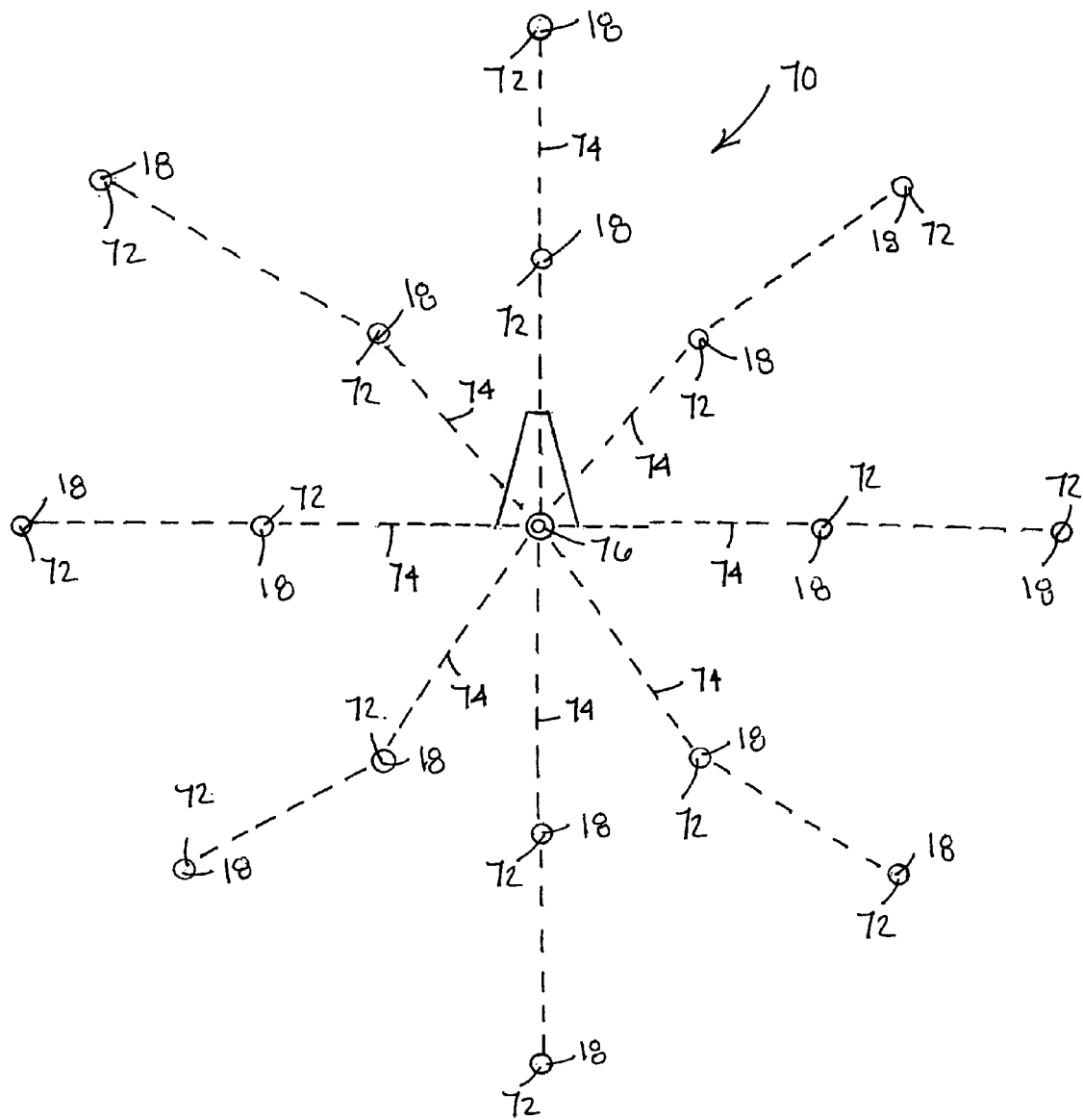
FIG. 11 LAYOUT OF 3 COMPONENT E FIELD SENSORS ON THE GROUND FOR MONITORING FRACTURE WIDENING OVER AN OIL AND GAS FIELD USING HIGH PRESSURE WATER INJECTION.

REMOTE SENSING ELECTRIC FIELD EXPLORATION SYSTEM

This application is based on a provisional patent application filed in the U.S. Patent and Trademark Office on Jun. 24, 2004 having Ser. No. 60/582,185 by the subject inventor.

BACKGROUND OF THE INVENTION (a) Field of the Invention

The subject invention relates to an airborne survey aircraft or towed geophysical survey bird exploration system and more particularly, but not by way of limitation, to a remote sensing electric field exploration system for exploration of oil and gas, mineral deposits and aquifers and using natural electromagnetic fields as an energy source. This invention is also applicable to offshore exploration using a towed geophysical "fish" system. It is further applicable to the detection of per-curser events ahead of earthquakes and volcanic eruptions.

(b) Discussion of the Prior Art

Heretofore, airborne electromagnetic systems have been in use for natural resource exploration from about 1950 onwards. These systems depend mainly upon the measurement of the magnetic and conductive properties of the underlying ground. Airborne magnetic survey systems, that employ magnetometers with advanced stages of development, provide very satisfactory results. However, airborne conductivity measurements of the underlying terrain made with airborne electromagnetic systems that currently exist, leave a great deal of room for improvement.

Electromagnetic systems typically operate at a minimum terrain clearance with respect to safety and employ electromagnetic transmitters operating in the frequency range from about 20 Hz. to 50 kHz with limited ground penetration. The ground currents and their related secondary magnetic fields as induced in the underlying ground by these transmissions are detected by receiving coils mounted in a tail boom on an aircraft or in an airborne survey bird towed behind the aircraft. Either fixed wing aircraft or helicopters are used for these surveys. The response from the underlying ground is related to it's conductivity and the depth of penetration of the transmitted fields. The latter is primarily a function of the frequency employed and the field strength of the electromagnetic field that is generated by the equipment. Typical maximum penetrations are in a range of 400 to 1000 ft.

The only exception to the above description was an airborne system known as "AFMAG" that was developed by S. H. Ward and others in the 1960's. (S. H. Ward et al. AFMAG-Applications and Limitations. Geophysics, Vol. XXXI, No. 3 (June 1966), pp. 576–605.) This system utilized the natural electromagnetic fields generated by lightning events occurring in distant electrical storms. These storms can provide a source for electromagnetic energizing of the ground, primarily in the frequency range of 20 Hz. to 500 Hz. Useable frequencies down to about 3 Hz. exist but high quality receiving coils and coil anti-vibration mountings are required for the lower frequencies. These were apparently not available in the AFMAG system.

Although the AFMAG system showed some promise, it did not achieve sufficient commercial acceptance to survive for more than a short period. Amongst the various problems of the system was the absence of the sophisticated instrumentation and digital data acquisition and processing systems that were not available at that time. Also and very importantly, there was a lack of adequate technology for suppressing the prime sources of noise, such as angular vibration of the detection coils in the presence of a strong magnetic field in the earth. The latter is associated with a motor generator effect that can detect a millionth of a degree of angular vibration.

The AFMAG system was also restricted to the use of audio frequency fields and did not employ extremely low frequency and much more powerful natural magnetotelluric fields, as used in the present invention. Just as importantly, the AFMAG system as well as all other airborne electromagnetic systems, past or present, did not make use of the valuable data available in the electric field components of electromagnetic fields.

The subject invention demonstrates that electric field data, as measured by methods that do not make contact with the ground, can be more important than the magnetic component of electromagnetic fields. Experience with the invention has also shown that, for specific reasons, the measuring of the electric field data is particularly valuable at frequencies below 3 Hz. This type of information is completely missing in the old AFMAG system as well as current airborne electromagnetic systems. The electric field data employed in the present invention lies in the range of frequencies from 0.1 Hz. to 3 Hz. and is used for the airborne detection of an induced polarization phenomena. Also, the related responses of dielectric interfacial polarization effects can be detected over aquifers and oil and gas fields. These low frequency polarization effects, which are strongly expressed in the electric fields, are discussed herein.

An important factor in comparing the subject airborne method with other airborne systems, is that for certain specific reasons, as presented, the operation can function at unusually high terrain clearances of 1000 ft. to 2000 ft. All other airborne systems that use transmitters have to fly at clearances in the range of 300 to 500 ft., which adds to problems related to interferences from power lines and pipelines. These interferences badly degrade data quality, often in areas where discovery potential is the greatest. With the present invention operating at greater clearances and at low frequencies, these problems disappear for all practical purposes.

In U.S. Pat. No. 6,765,383 issued to the subject inventor, a magnetotelluric geophysical survey system is described using an aircraft survey bird. The survey system uses natural electromagnetic EM fields as an energy source. The system includes the survey bird with electric dipoles, an angular motion detector and an airborne data recording system. The subject exploration survey system described herein is a substantial improvement over the survey system described in U.S. Pat. No. 6,765,383 and provides a unique airborne and/or ground survey system using a combination of remote sensing electric field EM techniques for oil, gas and mineral deposit exploration along with aquifer detection.

SUMMARY OF THE INVENTION

A primary object of the subject invention is to provide a unique airborne and/or ground survey system using a combination of remote sensing electric field techniques for deep exploration employing either natural magnetotelluric fields as an energy source, or artificial ground surface current or EM field sources. The airborne survey system operates in a frequency range from 0.1 Hz to 3.0 Hz. Also, it provides a technique for both deep and shallow detection of exploration information such as sulfide induced polarization effects or alternatively dielectric polarization effects related to the presence of oil, gas and aquifers.

Another object of the airborne exploration system is to operate at much higher terrain clearances from 1000 to 2000 feet when compared to other airborne systems operating in a range of 300 to 500 feet above the ground surface.

Yet another object of the invention is provide an airborne survey system that can explore for oil and gas, mineral deposits and aquifers with penetrations down to ten thousands feet and deeper beneath the ground surface.

Further and in particular, the survey system detects very important geophysical effects using spaced apart sets of three component, remote sensing electric field sensors, which heretofore have not been incorporated into either airborne or ground geophysical exploration systems. Thus, the electric field sensors can be employed with a fixed network of stations on the ground in a vicinity of high-pressure drilling and fracing operations used for the widening of fractures in an oil and gas well. In the latter application, the sensors can be used to continuously monitor the widening of the fractures down hole in the well in order to determine when further injection of well fluids is no longer required. Also, a network of electric field sensors can be used to generate valuable three-dimensional visualizations of the subsurface fracture distributions for maximizing the effectiveness of the fracing operation.

Still further, in airborne applications, the airborne survey system can detect underground aquifers using methods as described for identifying dielectric double-layer interfacial polarization effects. These effects are associated with an abnormally high dielectric constant of water and having a relatively high electrical conductivity in contact with earth materials having both a dielectric constant and conductivity that is fractional when compared with water.

Another object of the invention is it can be employed with a fixed network of electric field sensor stations on the ground in areas of earthquake hazards and volcanic eruptions for monitoring subsurface movements of fluids that may be precursors to a dangerous event. The measurement of the movements can cover a depth region from a few hundred feet to thousands of feet. Also, the electric field sensors used in the stations are low cost devices with minimal maintenance requirements.

Still another object of this passive airborne survey system is that it is a fraction of the weight of other airborne survey systems that employ large, heavy and costly transmitters. Also, the system can be used offshore employing a "fish" towed by a marine vessel, such as a seismic ship. Magnetotelluric fields penetrate up to 1000 feet of sea water and the telluric currents that they induce also circulate at great distances from the shorelines and between continents. Thus a towed "fish" version of the system is applicable in almost any ocean depths if the fish is towed 100 to 200 feet above the ocean floor.

Yet another object of the invention is to identify mineralization having very deep roots and having potential commercial value. The characterization of mineralization can be achieved by differential processing between pairs of frequencies, which penetrate from shallow depths down to depths such as 20,000 feet.

The subject remote sensing electric field airborne exploration system can be installed on a fixed wing aircraft, a towed bird, or an unmanned aircraft. The system includes a single optically pumped magnetometer, which possess extremely high sensitivities of 1 pico-Tesla and is immune to moderate amounts of angular flight motion. The output of the magnetometer is filtered in a range of from 0.1 Hz to 3.0 Hz and provides real time data on the magnetic components of magnetotelluric field strengths, as resolved in the direction of the earth's magnetic field.

Another key feature of the airborne version of the exploration system is the use of a pair of horizontally spaced three component electric field sensors mounted on the wing tips. These are used for measuring amplitude and polarity of electric field gradients that are perpendicular to the flight direction. This feature provides side view information on anomalous effects to the left or right of a flight line. Also indications of the range to an offset anomaly is provided. This is of considerable use in planning of ground and airborne follow-up. Electric field gradients along the flight line can be obtained from a time derivative of either left or right electric field sensors. This derivative is very important since the profile along the flight line, as filtered at various frequencies, provides information on a mineral source depth. A further very important aspect of the airborne system is that for each frequency of filtering, the signals can be split into in-phase and out-of-phase components of the filtered electric fields using the comparable filtered outputs of the airborne magnetometer as a phase reference. The out-of-phase components are very sensitive to both induced polarization and dielectric polarization effects. These are of great importance in the exploration of oil and gas as well as conductive bodies such as sulfides and native metals.

These and other objects of the present invention will become apparent to those familiar with ground and airborne geophysical survey systems when reviewing the following detailed description, showing novel construction, combinations of elements as described herein, and more particularly defined by the claims, it being understood that changes in the embodiments in the disclosed invention are meant to be included as coming within the scope of the claims, except insofar as they may be precluded by the prior art.

BRIEF DESCRIPTION OF THE DRAWINGS

FIG. 1 illustrates a perspective view of the subject airborne exploration system as installed in a fixed wing aircraft and carrying field sensors in two aerodynamic wing pods mounted on the aircraft's wing tips.

FIG. 2 is an enlarged perspective view illustrating the positions of three orthogonal electric dipoles making up one of the field sensors and mounted on a wing pod.

FIG. 3 is a perspective view of the electrical wiring connections to dipoles making up the field sensor mounted on the wing pod shown in FIG. 2.

FIG. 9 illustrates derivatives of the response of either a left or a right horizontal dipole of the airborne exploration system when traversing across an anomaly source buried at different depths below the surface.

FIG. 10 illustrates the differential response between the left and the right dipoles when flown at various distances adjacent to an anomaly source.

FIG. 11 illustrates a layout of multiple three component dipole sensors on the ground and used for monitoring fracture widening over an oil and gas field using high pressure water injection in a well bore.

DESCRIPTION OF THE PREFERRED EMBODIMENTS

Figure 4:
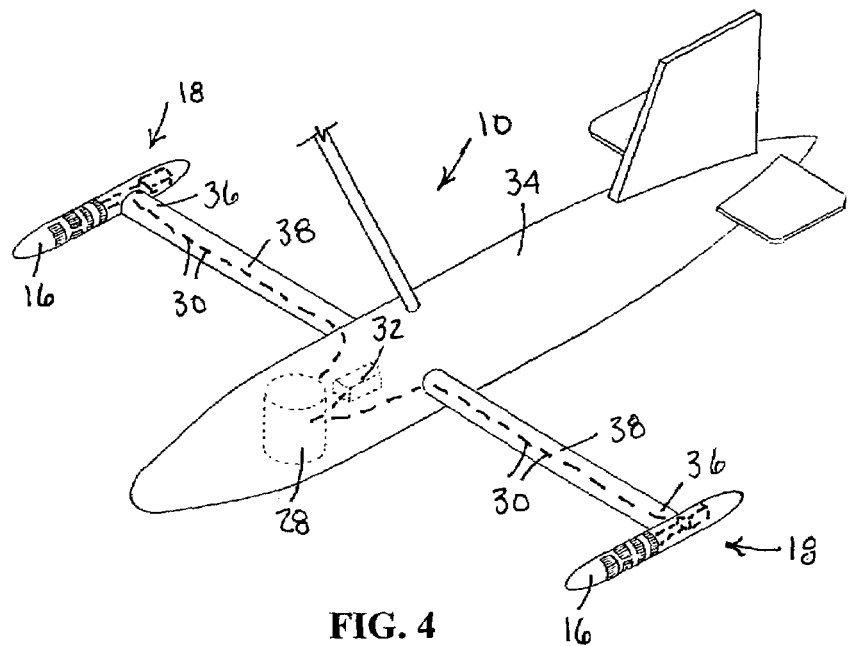
FIG. 4 is a perspective view of the subject airborne exploration system installed on a towed bird and carrying the field sensors on two aerodynamic wing pods mounted on the bird's horizontal wing boom.

In FIG. 1, a perspective view of the subject airborne exploration system is shown having a general reference numeral 10. In this example, the exploration system 10 is mounted on a fixed wing aircraft 12. The aircraft 12 carries on each wing tip 14 an aerodynamic housing pod 16. Mounted on each of the pods 16 are electric field sensors, having general reference numeral 18. The electric field sensors 18 include three orthogonal dipoles 20, 22 and 24. The field sensor and dipoles are shown more clearly in FIGS. 2 and 3. The housing pod 16 is made to minimize drag and the impact of charged dust particles on the surfaces of the dipoles 20, 22 and 24. The sensors 18 are used in association with a triple set of 3-axis angular motion detectors 26 installed at the rear of each pod 16. The commercial angular motion detectors 26 are based on the use of vibrating quartz tuning forks and have an angular sensitivity of 0.003 degrees. The angular motion detectors are fully adequate for use in compensating for noise produced by the angular motions of the electric field sensors 18 in the presence of a static vertical electric field gradient between the earth and the ionosphere along with air turbulence during flight. The motion detector 26 is shown in dashed lines in FIGS. 2 and 3. These angular motion detectors are essential for the proper functioning of the invention.

In should be mentioned that the key lower natural field frequencies employed in the airborne system and which are termed magnetotelluric (MT) fields, cover a typical range of 0.1 Hz to 3 Hz. These MT fields originate from an interaction between the solar wind and the outer reaches of the earth's magnetic field into space. The field strength of these fields increases by factor of 100 times from 1 Hz down to 0.1 Hz. These very strong and extremely low frequency fields can provide penetrations down to 20,000 feet and deeper in the earth, which makes them uniquely effective for oil and gas exploration as well as for deep ore bodies.

An optically pumped cesium vapor magnetometer 28, shown in dashed lines, is mounted in the rear of the aircraft 12 and electrically connected to the motion detectors 26 in the housing pods 16, via electric leads 30. Also, the inside of the aircraft 12 can include a motion detector 26 connected to electric dipoles 20, 22 and 24. The magnetometer 28 has a sensitivity of 1 picoTesla and provides a very sensitive measurement of the magnetotelluric MT fields. However, the sensitivity of the magnetometer 28 lies in a direction of the earth's magnetic field. Therefore, the MT frequency measurements are made in this direction. But, the derivative of the output of the magnetometer 28 provides data that is proportional to a horizontal gradient of the MT fields. The use of the optically pumped magnetometer 28 in the subject exploration system 10 has two important applications. The first is the magnetometer's immunity to noise from angular motions encountered during flight and the second is the high sensitivity and stability of the magnetometer 28.

The output of the magnetometer 28 is connected to a data acquisition unit 32. The data acquisition unit 32 is used for gathering and storing data. Processing of the data is by computer, using appropriate software, is carried out upon completion of the survey program. Also, the data acquisition unit 32 is electrically connected to electric dipoles 20, 22 and 24 for receiving and storing electric field data. The angular motion detectors 26 are also used for measuring and storing angular motion measurements for use in processing the data.

The location and navigation of the airborne exploration system 10 is provided by the use of GPS satellite data. The time and position data from the GPS satellite is recorded on the data acquisition unit 32.

Figure 5:
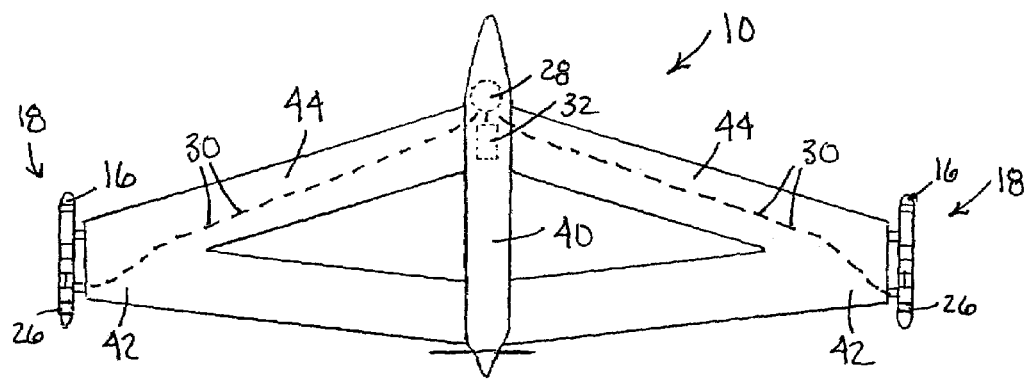
FIG. 5. is perspective view of the airborne exploration system mounted on the wing tips of an unmanned airborne vehicle (UAV).

An important feature of the exploration system 10 is the combination of the two electric field triaxial sensors 18 disposed in a spaced relationship that is perpendicular to the flight direction. In this example, the sensors 18 are disposed on the wing tips 14 of the aircraft 12. In FIGS. 4 and 5, the sensors 18 are mounted on opposite ends of a horizontal wing boom of a towed bird and perpendicular to the flight direction or alternatively on the wing tips of an unmanned airborne vehicle (UAV).

An optional third set of triaxial electric field sensors 18 can be mounted on a tail boom of the aircraft 12. This arrangement can provide three triangular gradient measurements that can be useful in determining the direction of the source of the signals. During survey traversing, this continuously changing set of gradient directions can be used to determine the locations of sources to the left or right of the flight line. This feature is of considerable value.

The sensors 18 measure the electric field components in three mutually perpendicular directions. The first dipole 20 is oriented along a horizontal X axis perpendicular to the flight direction. The second dipole 22 is oriented along a horizontal Y axis parallel to the length of the aircraft 12 and the flight direction. The third dipole 24 is oriented along a vertical Z axis perpendicular to the flight direction and the X and Y axis. The X, Y, and Z axis are shown in FIG. 2.

In FIG. 2, an enlarged perspective view of the housing pod 16 is shown illustrating the positions of three orthogonal electric dipoles 20, 22 and 24. As mentioned above, the dipoles make up the field sensors 18 mounted on the wing pods 16.

In FIG. 3, a perspective view of the electrical wiring connections from the dipoles 20, 22 and 24 to the motion detector 26 is shown. X1 and X2, shown in dashed lines, are electric leads connecting the first dipole 20 to the motion detector 26. Y1 and Y2, shown in dashed lines, are electric leads connecting the second dipole 22 to the motion detector and Z1 and Z2, shown in dashed lines, are electric leads connecting the third dipole 24 to the motion detector 26.

In FIG. 4, a perspective view of the subject airborne exploration system 10 is shown and installed on a towed bird 34 and carrying the field sensors 18 on the housing pods 16. The housing pods 16 are shown attached to the ends 36 of the bird's horizontal wing boom 38.

In FIG. 5, a perspective view of the airborne exploration system 10 is shown mounted on an unmanned airborne vehicle 40 (UAV) and carrying the field sensors 18 on the housing pods 16. The housing pods 16 are shown attached to the opposite ends 42 of the UAV's horizontal wing 44. As mentioned above, an optional third set of orthogonal electric dipoles can be mounted in a tail boom as previously described for manned airborne vehicles. It should be mentioned that because the subject exploration system 10 has a small enough weight, such that it can be miniaturized to fit into a UAV. This type of application is of considerable potential economic importance due to the low cost of flying surveys with a UAV as compared to normal aircraft and helicopters. Also, the towed bird 34 and the UAV 40 include the magnetometer 28 and data acquisition unit 32 connected to the motion detector 26 in the housing pods 16 using the electric leads 30.

Figure 6:
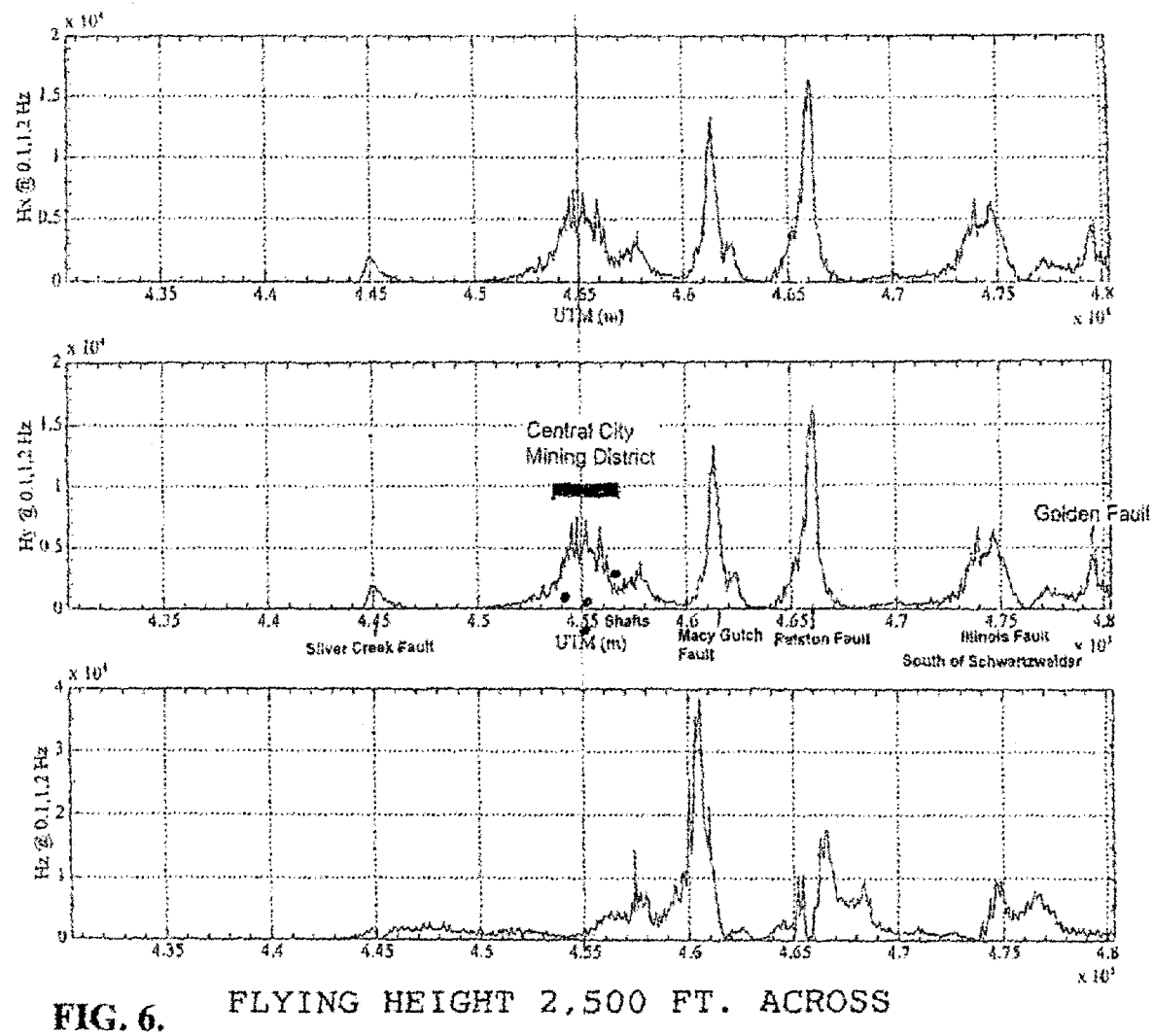
FIG. 6 illustrates the response of the airborne exploration system flown across a major mining district, Central City, Colo., at an unusual flying height of 2,500 ft with no cultural interference.

In FIG. 6, the response of the airborne exploration system 10 is shown when, using a suitable aircraft as illustrated in FIGS. 1, 4 and 5. This shows data acquired across a major mining district, Central City, Colo., at an unusually high flying height of 2,500 ft. Note that there is no cultural interference over the city since the system is immune to 60 Hz fields due to the very low frequencies employed by the invention.

Figure 7:
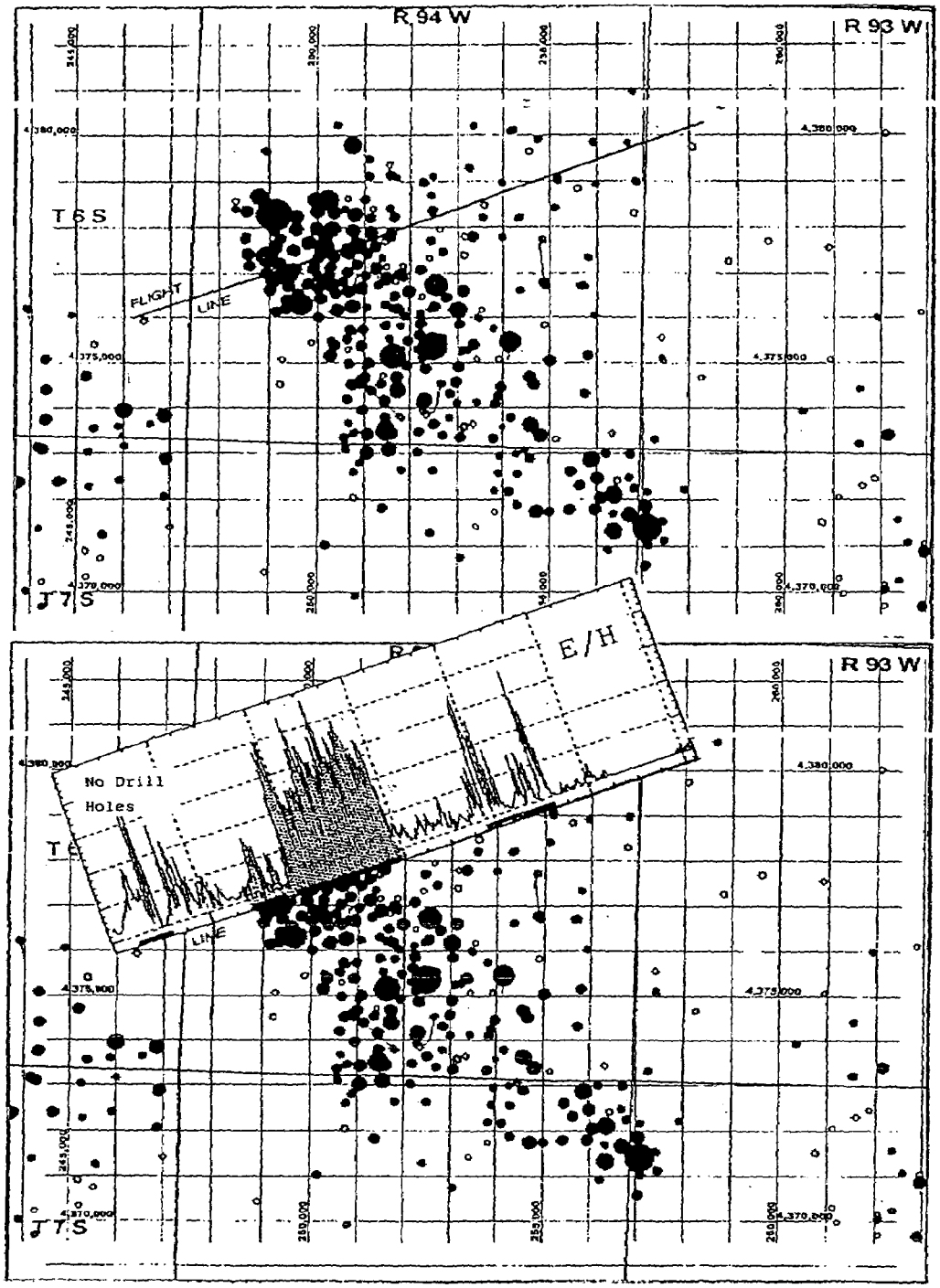
FIG. 7 illustrates the response of the airborne exploration system flown across a major, deep-seated gas field, Rulison Gasfield, Piceance Basin, Colo.

In FIG. 7, an example of the type of data acquired in a flight across a major gas field is shown. The field is the Rulison Gas Field, Piceance Basin, Colo. The data was obtained by dividing the electric field response (E) by the magnetic field response (H). This ratio is self normalizing for amplitude variations of the natural field. The highly oriented response of the field is due to the presence of oriented fractures. Such fracturing can be very important in assessing potential productivity of the reservoir. The wider the fracture widths the stronger the orientation effects.

Figure 8:
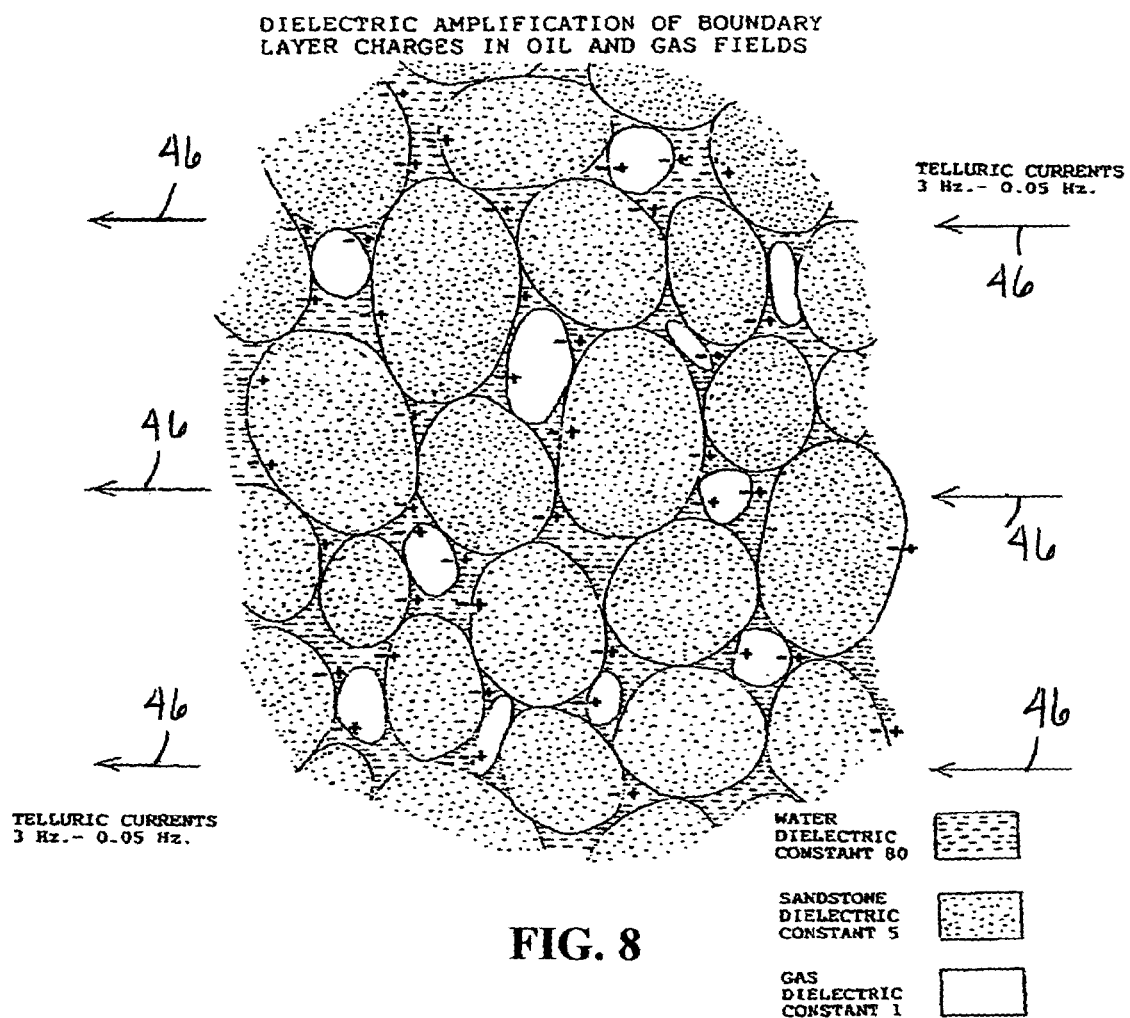
FIG. 8 illustrates dielectric interfacial boundary charges at boundaries of sandstone grains, water and gas.

In FIG. 8, the dielectric interfacial boundary charges at boundaries of sandstone grains, water and gas is illustrated. It is extremely important to note that the electric fields detected by the airborne exploration system 10 described herein are associated with the dielectric charge effects at hydrocarbon/water contacts as shown in this drawing. The hydrocarbon/water contacts exhibit very high contrast in both dielectric constant and conductivity giving rise to electric charges in the presence of telluric currents. These currents are shown as arrows 46 and are extremely strong at very low frequencies. The telluric currents 46 are induced by magnetotelluric fields and are measured in the 0.05 to 3 Hz range by the dipoles and a magnetometer as discussed above.

A further important aspect of the invention is that the filtered values of the magnetic frequency components of magnetotelluric fields, as measured in the air provide phase and amplitude references for the electric field. This covers the frequency range of prime interest in the invention form 3 Hz down to 0.1 Hz. Thus the natural fluctuations of the magnetic field components at each frequency of interest are used to normalize the electric field data, both in phase and amplitude. This approach eliminates the necessity for a ground base station and provides very satisfactory results. The elimination of a reference base station on the ground greatly simplifies the logistics of airborne surveys.

The electric field measurements are first normalized in amplitude using the filtered values for the same set of frequencies as used for the filtered magnetic field data as detected by the airborne magnetometer 28. The amplitude compensated electric components are then separated into in-phase and out-of-phase components using the filtered airborne magnetometer data as a phase reference in the magnetic field. Very importantly, the ratio of the out-of-phase components divided by the in-phase components in the E fields increases considerably in the presence of strong polarization effects. Such polarization effects can be caused either by the presence of sulfides due to the well-known geophysical effect of induced polarization. Alternatively, in the presence of increasing water content within the rocks, a dielectric polarization effect occurs. The latter is associated with the anomalously high dielectric constant of water of 80 and its relatively high conductivity as compared with the same parameters in rock materials and hydrocarbons.

The dielectric polarization effects associated with water can be clearly demonstrated experimentally operating with natural magnetotelluric fields under controlled laboratory type conditions. These tests involve the use of various concentrations of water in sand from 1 percent upwards. It is important to note that this effect is primarily detected in the electric field and has a lesser influence on magnetic field components of the magnetotelluric secondary fields that is generated by the underlying ground. For this reason, the measurement of the three components of the electric field is considerably more important than the measurement of three components of the magnetic field. Thus, in the simplified version of the exploration system 10 described above, there is only a requirement for a single magnetometer for measuring the magnetic components of the EM fields in a direction of the earth's magnetic field. What is critically important is the retention in the simplified version of the exploration system 10 is the measurement of the three orthogonal electric field components using the dipoles 20, 22 and 24. An example is shown in the field illustrated in FIG. 7, which indicates an enhanced anisotropy over an oil and gas field.

Related effects can also occur over sulfide and metallic mineralized deposits when fracture orientation is not uncommon. This is illustrated in FIG. 6. In this case, the sulfides or native metals tend to accumulated in fractures and produce some of the same anisotropic effects as noted for oil and gas. The charge distribution that occurs is this situation is due to the well known induced polarization effects that occur at boundaries between ionic conduction and electronic conduction when current flows through these boundaries.

The importance of the use of a pair of electric field sensors 18 is illustrated to provide gradient measurements of each of the electric field components that are being measured. These are disposed in a direction perpendicular to the flight line of the aircraft. This key feature provides a side view capability, which allows the exploration system 10 to identify ore bodies, oil and gas fields and other targets that are either to the left or to the right of the flight line or directly underneath the aircraft. While the use of the two sensors 18 are disclosed herein, it is also a fact that in general a single sensor 18 can be used with the aircraft for producing valuable gradient information by taking a derivative of the output of any selected direction of an electric E field and interpreting the derivative. The use of a third set of electric field sensors on an aircraft can be used to generate a triangular set of gradients that further enhance the definition of a target location. In FIG. 9, an Ey horizontal first gradient curve 48 is shown with an underground target 50 disposed at a shallow depth. Using the subject exploration system 10 with the pair of electric field sensors 18 employed perpendicular to the flight direction, it is possible to acquire the horizontal electric field gradients perpendicular to the flight direction, with the target at increasing depths indicated by arrow 52.

In this illustration, the character of the derivative changes significantly with the depth of the target 50 being detected. Thus the separation between the positive and negative amplitude peaks occurring over the target 50 provide information directly related to the depth of the target. The first gradient curve 48 illustrates a separation of "d1" between the positive and negative peaks. An Ey horizontal second gradient curve 54 is shown with a separation of "d1+X" between the positive and negative peaks with the target 50 at an increased depth from the ground surface. An Ey horizontal third gradient curve 56 is illustrated with a separation of "d1+2X" between the positive and negative peaks with the target 50 at a further depth beneath the ground surface. An Ey horizontal fourth gradient curve 58 is shown with a separation of "d1+3X" between the positive and negative peaks with the target at still a further depth beneath the ground surface.

Further information can be provided using the exploration system 10 with regard to target depth by the processing of the data at selected narrow band frequencies. Higher frequencies show shallow targets, whereas the lower frequencies show both shallow and deep targets. One target can be discriminated from another target using suitable regression techniques in order to remove the effects seen in the high frequency signal when compared to the low frequency signal, leaving a line profile which is primarily responsive to deeper targets and blind to shallow targets. This feature applies not only to targets underlying the flight line, but also to targets that are to the left or right of the flight line. Thus, the use of the multi-frequency processing of electric field data from the sensors 18 can provide a great deal of three dimensional information from near the ground surface down to depths of many thousands of feet.

In FIG. 10, lateral gradient curves are illustrated showing off line target sensing using lateral E field gradients. In this example, the exploration system 10 traverses a target 50 of interest at a short or far distance to the left or right of a flight line, shown as arrow 60. This feature of the exploration system is of considerable economic value since it is possible to fly wider flight lines at a reduced cost due to the system's side view capability as shown.

In this illustration, the character of the derivatives change significantly with the distance of the target 50 to either the left or right of the flight line 60. When the target 50 is close and to the left of the flight line, an Ex horizontal lateral first gradient curve 62 is shown with a high amplitude peak of the curve 62 disposed opposite and to the right of the target. When the target 50 is close and to the right of the flight line 60, an Ex horizontal lateral second gradient curve 64 is shown with a high amplitude peak of the curve 64 disposed opposite and to the right of the target. When the target 50 is further away and to the left of the flight line, an Ex horizontal lateral third gradient curve 66 is shown with a low amplitude peak of the curve 66 disposed opposite and to the right of the target. When the target 50 is further away and to the right of the flight line 60, an Ex horizontal lateral fourth gradient curve 68 is shown with a low amplitude peak of the curve 68 disposed opposite and to the right of the target 50.

In FIG. 11, an application of a ground exploration system is shown having a general reference 70. The ground exploration system 70 includes a plurality of ground stations 72 with electric field sensors 18 and dipoles 20, 22 and 24 formed in a selected grid. The sensors 18 include associated electronics to provide depth profiles in the three orthogonal components of an electric field generated beneath the ground surface. The depth of the profiles are sensitive to polarization effects, whether due to metallic sulfides or dispersion of oil and gas in contact with water, as illustrated in FIG. 8. Also, since the electric field measurements are made in three orthogonal directions, any preferred orientation of the electric field is measured in three dimensions. In many oil and gas fields, as shown in FIG. 7, the productivity is highly related to the disposition of fractures with the rocks and the width of the fractures. Thus, if the width of the fractures can be enhanced by high pressure injection of water or fracing of the well bore, the result can provide increased production of the oil and gas.

In this drawing, a selected grid is shown with the ground stations 72 and electric field sensors 18 along with recording systems, telemetry and electric line connections 74 to a central base station 76. The sensors 18 are sensitive to the orientation of fractures and their width, and during the course of injection of high pressure water, the degree of anisotropy in the electric field response will progressively increase. Anistropy refers to the differential amplitude response in the orthogonal directions. Since the ground stations 72 are low cost devices and can be used repeatedly on different survey projects, the ground exploration system 70 provides a valuable means for monitoring the progress of an oil and gas frac program as well as identifying a time at which to stop further water injection.

Also, the application of the ground exploration system 70 can be used for monitoring areas that are prone to earthquakes and volcanic eruptions. A differential response between the ground stations 72 is extremely sensitive to the movement of subsurface water, which will occur whenever there are pressure changes in various regions of the subsurface due to seismic and volcanic activity. In all of the above examples, the airborne and ground exploration systems are critically dependent on the differential response between the electric field sensors with dipoles and associated changes in stress amplitudes and direction. These changes strongly affect the distribution of subsurface ground water to which the systems are highly sensitive.

While the invention has been particularly shown, described and illustrated in detail with reference to the preferred embodiments and modifications thereof, it should be understood by those skilled in the art that equivalent changes in form and detail may be made without departing from the true spirit and scope of the invention as claimed except as precluded by the prior art.

What is claimed is:

1. An airborne exploration survey system for exploration of oil and gas, mineral deposits and aquifers, the survey system using natural electromagnetic fields as an energy source, the survey system mounted on an aircraft, the system comprising:

a pair of aerodynamic housing pods adapted for mounting on wing tips of the aircraft;

a pair of electric field sensors mounted on said housing pods, said field sensors including electric dipoles mounted thereon, said electric dipoles measuring electric fields in a frequency range from 0.1 Hz. to 3 Hz.;

an angular motion detector mounted inside the aircraft and connected to said electric dipoles for compensating for errors caused by angular motion of the aircraft when in the presence of strong static electric field gradients above the earth's surface; and a total field magnetometer mounted inside the aircraft, said magnetometer output filtered at selective frequencies in the range of 0.1 Hz to 3.0 Hz in order to receive amplitude and phase references for electric field measurements made of the same frequencies.

2. The system as described in claim 1 further including an airborne data acquisition unit mounted in the aircraft and connected to said electric dipoles for receiving and storing electric field data measurements, said data acquisition unit also connected to said angular motion detector for receiving and storing angular motion measurements and connected to said magnetometer for storing magnetic field data measurements.

3. The survey system as described in claim 2 further including an optional ground base station having a magnetometer, associated recording equipment and a GPS time and location reference, said ground base station used to record the onset of magnetic storms that may invalidate airborne data.

4. The survey system as described in claim 1 wherein said electric dipoles include a first dipole for taking data measurements in a horizontal X axis perpendicular to a length of the aircraft, a second dipole for taking data measurements in a horizontal Y axis parallel to the length of the aircraft and a third dipole for taking data measurements in a vertical Z axis perpendicular to the length of the aircraft.

5. The survey system as described in claim 3 further including a GPS time and location reference connected to said airborne data acquisition unit for allowing synchronization of base station data and airborne data.

6. An airborne exploration survey system for exploration of oil and gas, mineral deposits and aquifers, the survey system using natural electromagnetic fields as an energy source, the survey system mounted on an aircraft, the system comprising:

- a pair of aerodynamic housing pods adapted for mounting on wing tips of the aircraft;
- a pair of electric field sensors mounted on said housing pods, said field sensors including electric dipoles mounted thereon, said electric dipoles measuring electric fields in a frequency range from 0.1 Hz. to 3 Hz., said electric dipoles include a first dipole for taking data measurements in a horizontal X axis perpendicular to a length of the aircraft, a second dipole for taking data measurements in a horizontal Y axis parallel to the length of the aircraft and a third dipole for taking data measurements in a vertical Z axis perpendicular to the length of the aircraft;
- a pair of angular motion detectors mounted inside said housing pods and connected to said electric dipoles for compensating for errors caused by angular motion of the aircraft when in the presence of static electric field gradients;
- a magnetometer mounted inside the aircraft for measuring low frequency magnetic components of electromagnetic gradients; and
- an airborne data acquisition unit mounted in the aircraft and connected to said electric dipoles for receiving and storing electric field data measurements from said electric dipoles, said data acquisition unit also connected to said angular motion detectors for receiving and storing angular motion measurements and connected to said magnetometer for storing low frequency magnetic field data measurements.

7. The survey system as described in claim 6 further including a ground base station, said ground base station including a magnetometer, associated recording equipment and a GPS time reference for synchronization of electric and EM magnetic field data measurements recorder by said airborne data acquisition unit with the base station data.

8. The survey system as described in claim 7 further including a GPS time and location reference connected to said airborne data acquisition unit for allowing synchronization of base station data and airborne data as to phase and amplitude references of the magnetic and electric fields recorded.

9. An airborne exploration survey system for exploration of oil and gas, mineral deposits and aquifers, the survey system using natural electromagnetic fields as an energy source, the survey system mounted on an aircraft, the system comprising:

- at least one aerodynamic housing pod adapted for mounting on a wing tip of the aircraft;
- at least one electric field sensor mounted on said housing pod, said field sensor including electric dipoles mounted thereon, said electric dipoles measuring electric fields in a frequency range from 0.1 Hz. to 3 Hz., said electric dipoles include a first dipole for taking data measurements in a horizontal X axis perpendicular to a length of the aircraft, a second dipole for taking data measurements in a horizontal Y axis parallel to the length of the aircraft and a third dipole for taking data measurements in a vertical Z axis perpendicular to the length of the aircraft;
- an angular motion detector mounted inside the aircraft and connected to said electric dipoles for compensating for errors caused by angular motion of the aircraft when in the presence of strong static electric field gradients;
- a magnetometer mounted inside the aircraft for measuring the magnetic components of low frequency electromagnetic fields;
- an airborne data acquisition unit mounted in the aircraft and connected to said electric dipoles for receiving and storing electric field data measurements from said electric dipoles, said data acquisition unit also connected to said angular motion detector for receiving and storing angular motion measurements and connected to said magnetometer for storing low frequency magnetic field data measurements; and
- an optional ground base station synchronized with said airborne data acquisition unit, said ground base station including a magnetometer, associated recording equipment and a GPS time reference for synchronization of EM magnetic field data measurements recorded from said airborne data acquisition unit with base station data.

10. The survey system as described in claim 9 further including a GPS time and location reference connected to said airborne data acquisition unit for allowing synchronization of the optional base station magnetic field data and the relative airborne data as to phase and amplitude references of the magnetic and electric fields surveyed.

11. The survey system as described in claim 9 further including a plurality of electric field sensors with dipoles adapted for mounting on a ground surface and measuring electric fields in a frequency range of 0.1 Hz. to 3 Hz., said field sensors electrically connected to said ground base station.

12. The survey system as described in claim 9 wherein said motion detector includes a vibrating quartz tuning fork have angular sensitivity of 0.003 degrees.

13. The survey system as described in claim 9 wherein said magnetometer is an optically pumped cesium vapor magnetometer.

14. The survey system as described in claim 9 further including a pair of aerodynamic housing pods mounted on wing tips of the aircraft and a pair of electric field sensors with dipoles mounted on said housing pods.

15. The survey system as described in claim 9 further including a pair of angular motion detectors mounted inside said housing pods and connected to said dipoles.

* * * * *